United States Patent
Koike et al.

(10) Patent No.: US 7,419,924 B2
(45) Date of Patent: *Sep. 2, 2008

(54) SILICA GLASS CONTAINING TIO$_2$ AND PROCESS FOR ITS PRODUCTION

(75) Inventors: Akio Koike, Yokohama (JP); Yasutomi Iwahashi, Yokohama (JP); Yasuyuki Takimoto, Yokohama (JP); Shinya Kikugawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/589,875

(22) Filed: Oct. 31, 2006

(65) Prior Publication Data

US 2007/0042893 A1    Feb. 22, 2007

Related U.S. Application Data

(63) Continuation of application No. PCT/JP2005/012519, filed on Jun. 30, 2005.

(30) Foreign Application Priority Data

Jul. 1, 2004    (JP)    ............................. 2004-195682

(51) Int. Cl.
   *C03C 3/06*    (2006.01)
   *C03C 3/076*    (2006.01)
   *C03C 3/112*    (2006.01)
   *C03B 20/00*    (2006.01)

(52) U.S. Cl. ............................... 501/54; 501/55; 501/57

(58) Field of Classification Search ............... 501/54, 501/69, 55, 57
   See application file for complete search history.

(56) References Cited

U.S. PATENT DOCUMENTS

| | | | | |
|---|---|---|---|---|
| 2,326,059 | A | * | 8/1943 | Nordberg ...................... 501/94 |
| 2002/0157421 | A1 | | 10/2002 | Ackerman et al. |
| 2005/0245382 | A1 | | 11/2005 | Iwahashi et al. |
| 2005/0245383 | A1 | | 11/2005 | Iwahashi et al. |
| 2005/0272590 | A1 | | 12/2005 | Iwahashi et al. |
| 2007/0042893 | A1 | | 2/2007 | Koike et al. |

FOREIGN PATENT DOCUMENTS

| | | | |
|---|---|---|---|
| JP | 60-176945 | A * | 9/1985 |
| WO | WO 2004/089838 | A1 | 10/2004 |
| WO | WO 2004/089839 | A1 | 10/2004 |

OTHER PUBLICATIONS

U.S. Appl. No. 11/589,875, filed Oct. 31, 2006, Koike, et al.
U.S. Appl. No. 11/435,887, filed May 18, 2006, Iwahashi, et al.
U.S. Appl. No. 11/957,855, filed Dec. 17, 2007, Iwahashi, et al.

* cited by examiner

*Primary Examiner*—Anthony J. Green
(74) *Attorney, Agent, or Firm*—Oblon, Spivak, McClelland, Maier & Neustadt, P.C.

(57) ABSTRACT

It is to provide a silica glass containing TiO$_2$, having a wide temperature range wherein the coefficient of thermal expansion is substantially zero.

A silica glass containing TiO$_2$, which has a TiO$_2$ concentration of from 3 to 10 mass %, a OH group concentration of at most 600 mass ppm and a Ti$^{3+}$ concentration of at most 70 mass ppm, characterized by having a fictive temperature of at most 1,200° C., a coefficient of thermal expansion from 0 to 100° C. of 0±150 ppb/° C., and an internal transmittance $T_{400-700}$ per 1 mm thickness in a wavelength range of from 400 to 700 nm of at least 80%. A process for producing a silica glass containing TiO$_2$, which comprises porous glass body formation step, F-doping step, oxygen treatment step, densification step and vitrification step.

13 Claims, 5 Drawing Sheets

SILICA GLASS CONTAINING TIO₂ AND PROCESS FOR ITS PRODUCTION

TECHNICAL FIELD

The present invention relates to a silica glass containing $TiO_2$, and relates to a transparent extremely low thermal expansion glass to be used for an optical material for an exposure device to be used for EUV lithography. Further, it relates to a silica glass containing $TiO_2$ useful for a material which is strictly required to have low thermal expansion properties and transparency, such as a material for an optical component, a material for a large reflector substrate, a material for a precision component such as a standard for precision measurement and an electronic material. In the present invention, EUV (Extreme Ultra Violet) light means light having a waveband in a soft X-ray region or in a vacuum ultraviolet region and specifically means light having a wavelength at a level of from 0.2 to 100 nm.

BACKGROUND ART

In recent years, in photolithography, along with high integration and high functionality of integrated circuits, microsizing of integrated circuits has been progressing, and an exposure device is required to form an image of a circuit pattern on a wafer with a high resolution in a deep focal depth, whereby blue shift of the exposure light source is in progress. The exposure light source has been advanced from the conventional g-line (wavelength: 436 nm), i-line (wavelength: 365 nm) or KrF excimer laser (wavelength: 248 nm), and now an ArF excimer laser (wavelength: 193 nm) is being used. Further, in order to be prepared for an integrated circuit for the next generation where the line width of a circuit pattern will be less than 100 nm, it is considered to be prospective to employ a $F_2$ laser (wavelength: 157 nm) as the exposure light source, but it is considered that even this can not cover beyond a generation of a line width of 70 nm.

Under these circumstances, a lithographic technique employing typically a light having a wavelength of 13 nm among EUV light (extreme ultraviolet light) as the exposure light source, has attracted attention, as it may be applied to the printing of feature of 50 nm or smaller. The image-forming principle of the EUV lithography (hereinafter referred to as "EUVL") is the same as the conventional photolithography to such an extent that a mask pattern is transferred by means of an optical projection system. However, in the energy region of EUV light, there is no material to let the light pass therethrough. Accordingly, a refraction optical system can not be used, and an optical system will be required to be a reflection optical system in all cases.

The optical material for the exposure device to be used for EUVL is basically constituted of (1) a base material, (2) a reflective multilayer formed on the base material and (3) an absorber layer formed on the reflective multilayer. The optical material for the exposure device to be used for EUVL is a reflection type, and thus the base material is not necessarily required to have light transparency. However, an extremely low thermal expansion material having transparency has been desired so as to make evaluation or inspection possible for the purpose of evaluating homogeneity or surface smoothness by using e.g. an interferometer so that the base material will not deform even when irradiated with EUV light, or for the purpose of judging presence or absence of internal defects such as bubbles or striae by microscopic or visual inspection.

Further, a transparent low thermal expansion material is widely used for materials which are strictly required to have low thermal expansion properties and transparency, such as a material for an optical component, a material for a large reflector substrate, a material for a ring laser gyroscope, a material for a precision component such as a standard for precision measurement and an electronic material.

The extremely low expansion material having transparency may be a silica glass containing $TiO_2$ (hereinafter referred to as "$TiO_2$—$SiO_2$ glass") represented by UEL#7972 (tradename) manufactured by Corning Incorporated and a vitrified crystallized glass represented by ZERODUR (tradename) manufactured by SCHOTT. U.S. Patent application publication No. 2002/157421 discloses a method which comprises forming a $TiO_2$—$SiO_2$ porous glass body, converting it to a glass body, and then obtaining a mask substrate therefrom.

$TiO_2$—$SiO_2$ glass is known to be an extremely low thermal expansion material having a coefficient of thermal expansion smaller than quartz glass, and the coefficient of thermal expansion can be controlled by the $TiO_2$ content in the glass, whereby it is possible to obtain a zero expansion glass having a coefficient of thermal expansion being close to zero. Accordingly, $TiO_2$—$SiO_2$ glass is prospective as a material to be used for an optical material for the exposure device for EUVL. However, in $TiO_2$—$SiO_2$ glass, the temperature range wherein the coefficient of thermal expansion is substantially zero, is limited to about room temperature. Further, since it contains a large amount of OH groups, there are absorptions at several wavelengths, e.g. near 2,700 nm.

On the other hand, a crystallized glass comprises a crystalline phase exhibiting negative thermal expansion and a glass phase exhibiting positive thermal expansion, and it can be a zero expansion material having a coefficient of thermal expansion being close to zero, by controlling a heat step for crystallization. Further, the crystal grains are small, and the difference in refractive index between the crystalline phase and the glass phase as a matrix is small, and accordingly the crystalline glass is transparent. Accordingly, there is a possibility to obtain a material excellent in thermal expansion characteristics by contriving the composition of the base glass or a heat treatment step. However, the change in dimension along with the change in temperature exhibits hysteresis due to structural relaxation, such being problematic in absolute dimensional accuracy. Further, an optical material for the exposure device for EUVL is required to have an extremely smooth surface, such as a surface having a roughness Ra of at most 0.15 nm, but a smooth surface is hardly obtained due to influence of the crystal grains.

In a material for an optical component, a material for a precision component such as a standard for precision measurement, an electronic material, etc., and in an optical component for an exposure device for EUVL, the temperature range wherein the coefficient of thermal expansion is substantially zero is preferably broad, but in a conventional $TiO_2$—$SiO_2$ glass, the temperature range wherein the coefficient of thermal expansion is substantially zero is limited to about room temperature. Further, a conventional crystallized glass has a problem in absolute dimensional accuracy since the change in dimension along with the change in temperature exhibits hysteresis due to structural relaxation, and a crystallized glass having a smooth surface can hardly be obtained.

DISCLOSURE OF THE INVENTION

Embodiment 1 of the present invention provides a silica glass containing $TiO_2$, having a $TiO_2$ concentration of from 3 to 10 mass %, a OH group concentration of at most 600 wtppm (hereinafter wtppm will be referred to as mass ppm), i.e. at most 600 mass ppm, and a $Ti^{3+}$ concentration of at most 70 mass ppm, characterized by having a fictive temperature of at most 1,200° C., a coefficient of thermal expansion from 0 to 100° C. (hereinafter referred to as coefficient of thermal expansion $CTE_{0-100}$) of $0\pm150$ ppb/° C., and an internal transmittance per 1 mm thickness in a wavelength range of from 400 to 700 nm (hereinafter referred to as internal transmittance $T_{400-700}$) of not less than 80%, i.e. at least 80%.

Embodiment 2 provides the silica glass containing $TiO_2$ according to Embodiment 1, which has a F concentration of at least 100 mass ppm.

Embodiment 3 provides the silica glass containing $TiO_2$ according to Embodiment 1 or 2, which has an internal transmittance per 1 mm thickness in a wavelength range of from 300 to 3,000 nm (hereinafter referred to as internal transmittance $T_{300-3000}$) of at least 70%.

Embodiment 4 provides the silica glass containing $TiO_2$ according to Embodiment 1, 2 or 3, which has a temperature range of at least 4.0° C. wherein the coefficient of thermal expansion is $0\pm5$ ppb/° C.

Embodiment 5 provides a process for producing a silica glass containing $TiO_2$, which comprises a step of forming a porous $TiO_2$—$SiO_2$ glass body by depositing and growing on a target $TiO_2$—$SiO_2$ glass particles obtained by flame hydrolysis of glass-forming materials (porous glass body formation step), a step of heating the porous $TiO_2$—$SiO_2$ glass body to a densification temperature to obtain a $TiO_2$—$SiO_2$ dense body (densification step) and a step of heating the $TiO_2$—$SiO_2$ dense body to a vitrification temperature to obtain a high transmittance glass body (vitrification step), and further comprises, after vitrification step, a step of cooling the high transmittance glass body at a temperature of at least 1,200° C. to 500° C. at an average cooling rate of at most 150° C./hr (hr represents one hour, the same applies hereinafter), or a step of holding the high transmittance glass body at a temperature exceeding 600° C. for a predetermined time and then cooling it to 500° C. at an average cooling rate of at most 150° C./hr (annealing step).

Embodiment 6 provides a process for producing a silica glass containing $TiO_2$, which comprises a step of forming a porous $TiO_2$—$SiO_2$ glass body by depositing and growing on a target $TiO_2$—$SiO_2$ glass particles obtained by flame hydrolysis of glass-forming materials (porous glass body formation step), a step of heating the porous $TiO_2$—$SiO_2$ glass body to a densification temperature to obtain a $TiO_2$—$SiO_2$ dense body (densification step) and a step of heating the $TiO_2$—$SiO_2$ dense body to a vitrification temperature to obtain a high transmittance glass body (vitrification step), and further comprises, between porous glass body formation step and densification step, a step of holding the porous $TiO_2$—$SiO_2$ glass body in an atmosphere containing oxygen and F to obtain a F-containing porous glass body (F-doping step), and a step of holding the F-containing porous glass body in an atmosphere containing at least 15% of oxygen to obtain a porous $TiO_2$—$SiO_2$ glass body having an oxygen treatment applied thereto (oxygen treatment step).

Embodiment 7 provides the process for producing a silica glass containing $TiO_2$ according to Embodiment 6, which further comprises, after vitrification step, a step of cooling the high transmittance glass body at a temperature of at least 1,200° C. to 500° C. at an average cooling rate of at most 150° C./hr, or a step of holding the high transmittance glass body at a temperature exceeding 500° C. for a predetermined time and then cooling it to 500° C. at an average cooling rate of at most 150° C./hr (annealing step).

Further, Embodiment 8 provides the process for producing a silica glass containing $TiO_2$ according to Embodiment 5 or 7, which further comprises, between vitrification step and annealing step, a step of heating the high transmittance glass body to a temperature of at least a softening temperature and forming it into a desired shape to obtain a formed glass body (forming step).

According to the present invention, it is possible to obtain a vitrified extremely low thermal expansion glass having a wide temperature range wherein the coefficient of thermal expansion is substantially zero and being excellent in transparency. Accordingly, it is very useful as a material for a component constituting an optical system to be used for EUVL. Further, it is useful as a vitrified extremely low expansion glass to be used for various materials which are strictly required to have low thermal expansion properties and transparency (to be not colored), such as a material for an optical component, a material for a large reflector substrate, a material for a precision component such as a standard for precision measurement and an electronic material.

Figure 1:
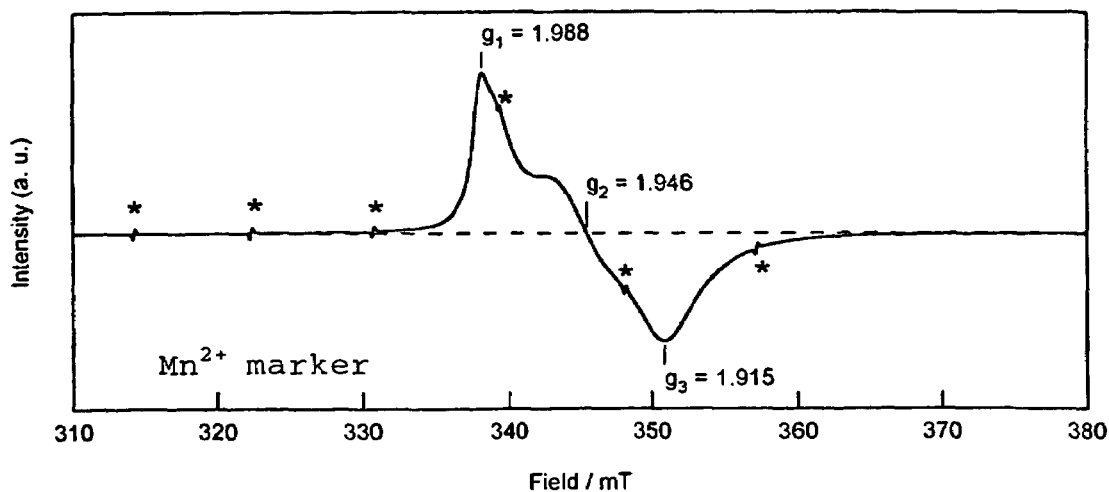
FIG. 1 is a diagram illustrating the result of electron spin resonance (ESR) measurement of one example of the glass of the present invention.
Figure 2:
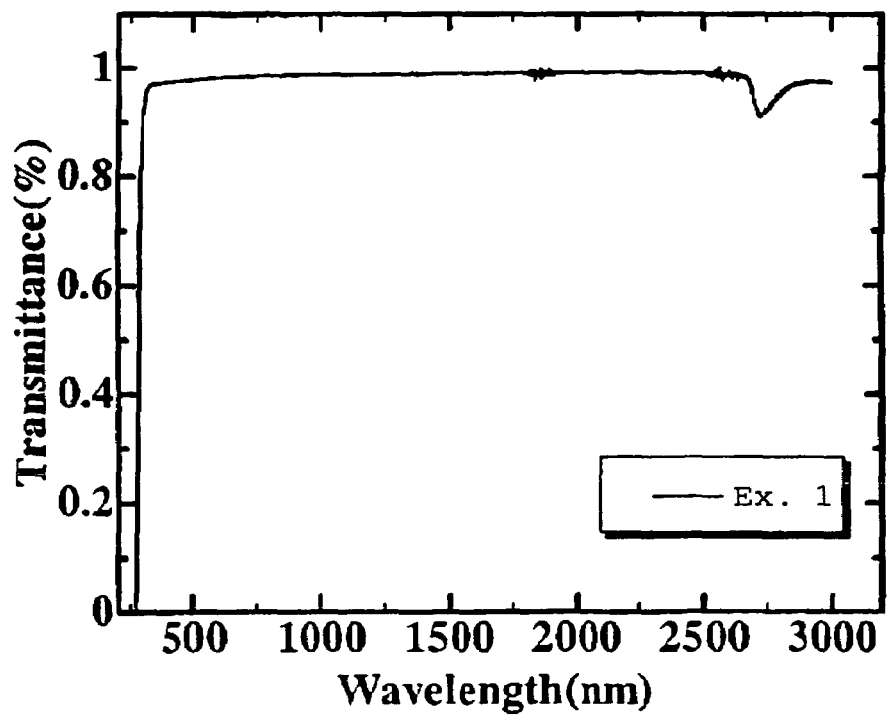
FIG. 2 is a diagram illustrating the internal transmittance (200 to 3,000 nm) per 1 mm thickness of the glass in Example 1 of the present invention.
Figure 3:
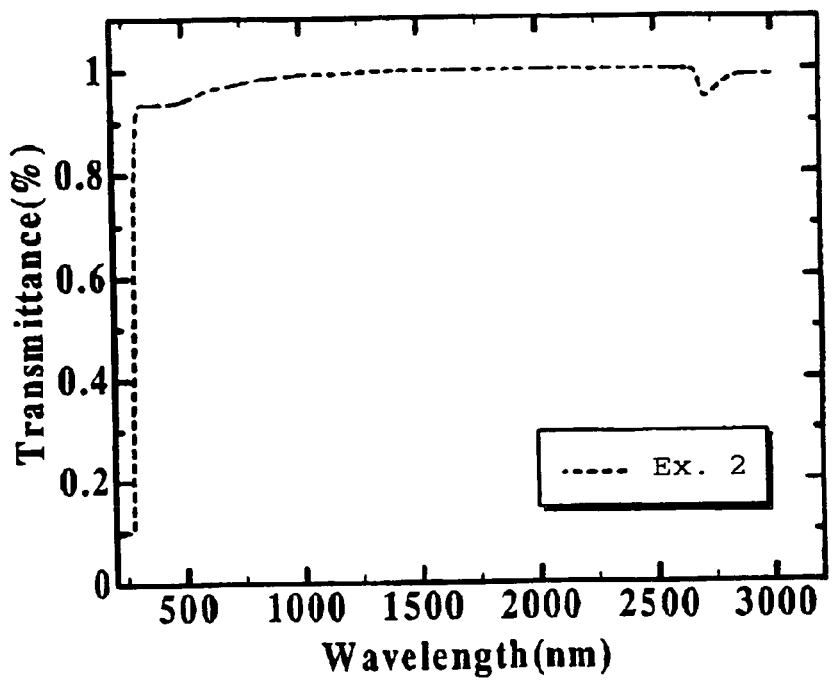
FIG. 3 is a diagram illustrating the internal transmittance (200 to 3,000 nm) per 1 mm thickness of the glass in Example 2 of the present invention.
Figure 4:
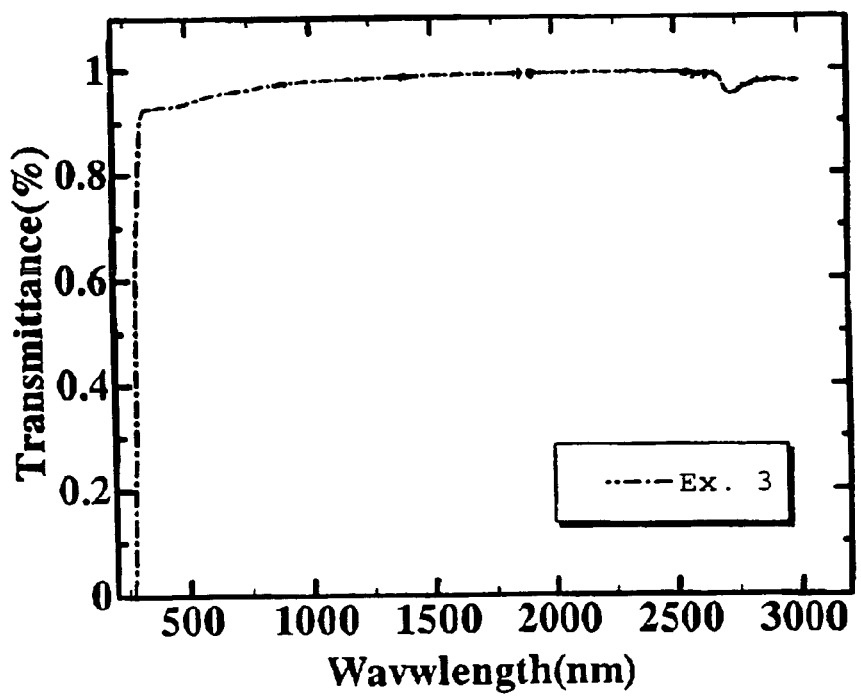
FIG. 4 is a diagram illustrating the internal transmittance (200 to 3,000 nm) per 1 mm thickness of the glass in Example 3 of the present invention.
Figure 5:
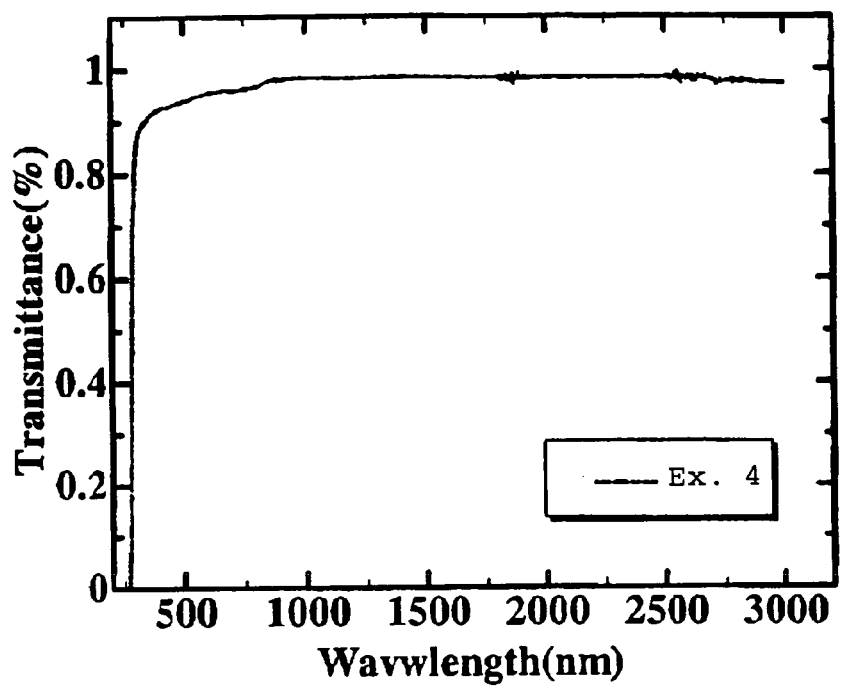
FIG. 5 is a diagram illustrating the internal transmittance (200 to 3,000 nm) per 1 mm thickness of the glass in Example 4 of the present invention.
Figure 6:
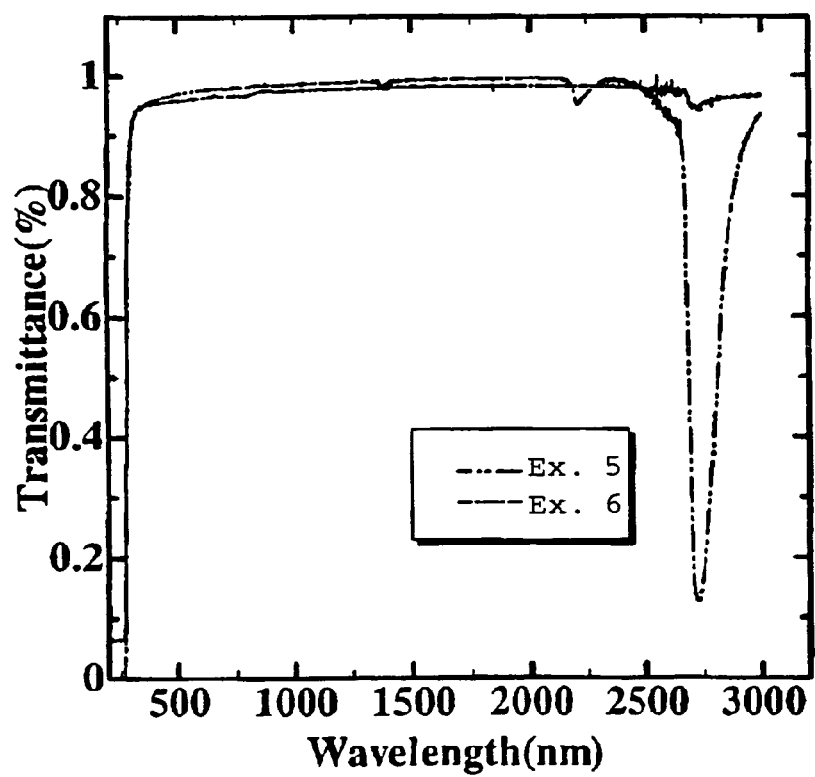
FIG. 6 is a diagram illustrating the internal transmittances (200 to 3,000 nm) per 1 mm thickness of the glasses in Examples 5 and 6 of the present invention.
Figure 7:
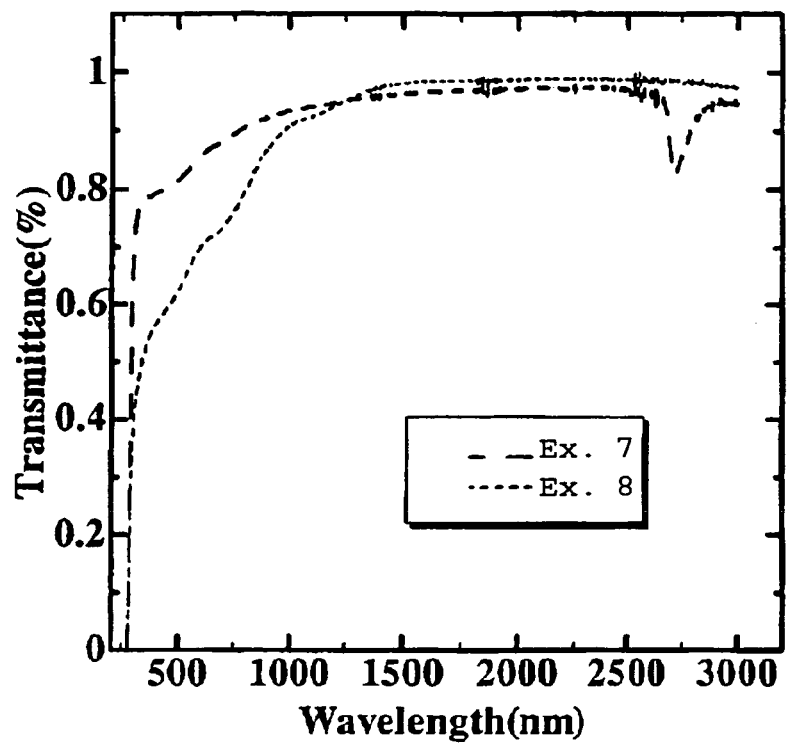
FIG. 7 is a diagram illustrating the internal transmittances (200 to 3,000 nm) per 1 mm thickness of the glasses in Examples 7 and 8 of the present invention.

BEST MODE FOR CARRYING OUT THE INVENTION $TiO_2$—$SiO_2$ glass is known to have a coefficient of thermal expansion which changes depending upon the concentration of $TiO_2$, and the coefficient of thermal expansion of $TiO_2$—$SiO_2$ glass containing about 7 mass % of $TiO_2$ is substantially zero at near room temperature.

The $TiO_2$—$SiO_2$ glass of the present invention is preferably a silica glass containing from 3 to 10 mass % of $TiO_2$. If the content of $TiO_2$ is less than 3 mass %, zero expansion may not be accomplished, that is, the coefficient of thermal expansion $CTE_{0-100}$ may not be $0\pm150$ ppb/° C., and if it exceeds 10 mass %, the coefficient of thermal expansion is likely to be negative. The $TiO_2$ concentration is more preferably from 5 to 9 mass %.

In the present invention, the internal transmittance $T_{400-700}$ per 1 mm thickness in a wavelength range of from 400 to 700 nm is at least 80%. If it is less than 80%, a visible light is likely to be absorbed, and there may be inconvenience in inspection of evaluation such that presence or absence of internal defects such as bubbles or striae is less likely to be easily judged by microscopic or visual inspection. Further, in a case of a component to let a visible light pass therethrough, characteristics of the component may be impaired since the transmitted light intensity decreases by use. It is preferably at least 85%, particularly preferably at least 90%.

In the present invention, the internal transmittance per 1 mm thickness in a wavelength range of from 300 to 700 nm (hereinafter referred to as internal transmittance $T_{300-700}$) is preferably at least 70%, more preferably at least 75%, particularly preferably at least 80%.

In the present invention, the internal transmittance $T_{300-3000}$ per 1 mm thickness in a wavelength range of from 300 to 3,000 nm is preferably at least 70%, particularly preferably at least 80%. If it is less than 70%, there may be inconvenience in inspection or evaluation such that an inspection to control homogeneity or surface smoothness by a measuring equipment using a laser interferometer, is less likely to be easily carried out. Further, in a case of a component to let a visible light or an infrared light pass therethrough, characteristics of the component may be impaired since the transmitted light intensity decreases.

The transmittance is measured as follows. The measurement is carried out with respect to a polished glass with a thickness of 1 mm by using a spectrophotometer (U-3500 manufactured by Hitachi Ltd.). The internal transmittance per 1 mm thickness is calculated as follows. Samples polished to the same extent and having different thicknesses, for example, a sample with a thickness of 2 mm and a sample with a thickness of 1 mm are used, and their transmittances are measured. The transmittances are converted into absorbances, and then the absorbance of the sample with a thickness of 1 mm is subtracted from the absorbance of the sample with a thickness of 2 mm to obtain an absorbance per 1 mm, which is again converted into the transmittance to obtain an internal transmittance per 1 mm thickness.

Simply, the internal transmittance is calculated by the following method. The loss in transmittance of a quartz glass with a thickness of about 1 mm polished to the same extent, at a wavelength at which there is no absorption by quartz glass, for example at a wavelength near 2,000 nm, is considered as a loss by reflection at front surface and rear surface. The loss in transmittance is converted into the absorbance to obtain the absorbance of the loss by reflection at front surface and rear surface. The transmittance of the measurement sample with a thickness of 1 mm in the transmittance measurement wavelength region is converted into the absorbance, and the absorbance of the quartz glass with a thickness of about 1 mm near 2,000 nm is subtracted therefrom. The difference in absorbance is again converted into the transmittance to obtain the internal transmittance per 1 mm thickness (hereinafter the internal transmittance means an internal transmittance per 1 mm thickness).

In the present invention, the OH group concentration is at most 600 mass ppm. If it exceeds 600 mass ppm, the light transmittance in a wavelength band in the near infrared region decreases due to absorption resulting from the OH groups, and $T_{300-3000}$ may be less than 70%. It is preferably at most 400 mass ppm, more preferably at most 200 mass ppm, particularly preferably at most 100 mass ppm.

The OH group concentration is measured as follows. The measurement is carried out by means of an infrared spectrophotometer, and from the absorption peak at a wavelength of 2.7 μm, the OH group concentration is obtained (J. P. Williams et. Al., American Ceramic Society Bulletin, 55(5), 524, 1976). The detection limit by this method is 0.1 mass ppm.

In the present invention, the $Ti^{3+}$ concentration is at most 70 mass ppm. The present inventors have found that the $Ti^{3+}$ concentration and coloring, particularly the internal transmittance $T_{400-700}$ are related. Namely, if the $Ti^{3+}$ concentration exceeds 70 mass ppm, the glass may be colored brown, the internal transmittance $T_{400-700}$ may decrease, and such a material is insufficient as a material which is required to have transparency. It is preferably at most 50 mass ppm, more preferably at most 20 mass ppm.

The $Ti^{3+}$ concentration was obtained by electron spin resonance (ESR) measurement. The measurement was carried out under the following conditions.

Frequency: Near 9.44 GHz (X-band)
Output: 4 mW
Modulated magnetic field: 100 KHz, 0.2 mT
Measurement temperature: Room temperature
ESR species integration range: 332 to 368 mT
Sensitivity calibration: Carried out at a $Mn^{2+}$/MgO peak height in a certain amount The result of an example wherein measurement was carried out with respect to the glass of the present invention is shown in FIG. 1. In FIG. 1, the vertical axis represents the signal intensity, and the horizontal axis represents the magnetic field intensity (mT). As a result of measurement, the obtained signal (differentiated form) was a signal having a shape with anisotropy of $g_1=1.988$, $g_2=1.946$ and $g_3=1.915$. Usually, $Ti^{3+}$ in glass is observed at near g=1.9, and thus they are considered as signals attributable to $Ti^{3+}$, and $Ti^{3+}$ concentration was obtained by comparing the intensity after integration two times with the intensity of a corresponding standard sample having a known concentration after integration two times.

In the present invention, the coefficient of thermal expansion from 0 to 100° C. (hereinafter referred to as $CTE_{0-100}$) is 0±150 ppb/° C. If the absolute value of the coefficient of thermal expansion exceeds 150 ppb/° C., the thermal expansion can not be ignored in a case where an extremely low coefficient of thermal expansion is required such as in a case of an optical material for an exposure device for EUVL. It is preferably 0±100 ppb/° C. Likewise, the coefficient of thermal expansion from −50 to 150° C. (hereinafter referred to as $CTE_{-50-150}$) is preferably 0±200 ppb/° C., more preferably 0±150 ppb/° C.

Further, for an optical material for an exposure device for EUVL, the average coefficient of thermal expansion of glass at 22.0° C. (hereinafter referred to as $CTE_{22}$) is preferably 0±30 ppb/° C. It is more preferably 0±20 ppb/° C., furthermore preferably 0±10 ppb/° C., particularly preferably 0±5 ppb/° C.

Further, with the glass of the present invention having a coefficient of thermal expansion close to zero, by lowering the fictive temperature or by F-doping, the temperature range wherein the coefficient of thermal expansion is 0±5 ppb/° C. is broadened. When the glass is used for an application wherein the change in the coefficient of thermal expansion by a change in temperature is influential, such as a material to be used for an optical material for an exposure device for EUVL, the temperature range wherein the coefficient of thermal expansion is 0±5 ppb/° C., is preferably at least 4.0° C., more preferably at least 4.5° C. In a case where the temperature range wherein the coefficient of thermal expansion is 0±5 ppb/° C. should be broadened, the temperature range is preferably at least 5.0° C., particularly preferably at least 6.0° C.

The coefficient of thermal expansion can be measured within a range of from −150 to 200° C. by using a laser interferometric dilatometer (LIX-1, manufactured by ULVAC-RIKO, Inc.) for example. In order to increase the measurement accuracy of the coefficient of thermal expansion, it is effective to measure the coefficient of thermal expansion several times and to obtain an average of the measured values. The temperature range wherein the coefficient of thermal expansion is 0±5 ppb/° C. can be obtained from the range of a temperature at which the coefficient of thermal expansion is from −5 to 5 ppb/° C. from a curve of the coefficient of thermal expansion obtained by measurement.

In the present invention, the fictive temperature is at most 1,200° C. The present inventors have found that the fictive temperature and the extent of the temperature range for zero expansion are related. Namely, if the fictive temperature exceeds 1,200° C., the temperature range for zero expansion tends to be narrow, and such a material tends to be inadequate as a material to be used for an optical material for an exposure device for EUVL. The fictive temperature is preferably at most 1,100° C., more preferably at most 1,000° C., particularly preferably at most 900° C.

In order to obtain such a fictive temperature in the present invention, a method is, for example, effective wherein the glass material is held at a temperature of from 600 to 1,200° C. for at least 5 hours and then the temperature is lowered to at most 500° C. at an average cooling rate of at most 150° C./hr. Otherwise, a method is effective wherein a high transmittance glass body at a temperature of at least 1,200° C. is cooled to 500° C. at an average cooling rate of at most 150° C./hr.

The fictive temperature is measured as follows. With respect to polished $TiO_2$—$SiO_2$ glass, the absorption spectrum is taken by using an infrared spectrometer (Magna 760, manufactured by Nikolet Company). At that time, the data taking interval is set to be about 0.5 $cm^{-1}$, and for the absorption spectrum, an average value obtained by scanning 64 times, is employed. In the infrared absorption spectrum thus obtained, the peak observed at about 2,260 $cm^{-1}$ is attributable to an overtone of stretching vibration by the Si—O—Si bond of $TiO_2$—$SiO_2$ glass. The fictive temperature is obtained from this peak position by using a calibration curve which is prepared by glass having the same composition having a known fictive temperature. Otherwise, the reflection spectrum of the surface is measured in a similar manner by means of a similar infrared spectrometer. In the infrared reflection spectrum obtained in such a manner, the peak observed at about 1,120 $cm^{-1}$ is attributable to the stretching vibration by the Si—O—Si bond of $TiO_2$—$SiO_2$ glass. The fictive temperature is obtained from this peak position by using a calibration curve which is prepared by glass of the same composition having a known fictive temperature.

The $TiO_2$—$SiO_2$ glass of the present invention may contain F (fluorine). It is known long before that the F concentration is influential over the structural relaxation of glass (Journal of Applied Physics 91(8), 4886(2002)). According to this report, the structural relaxation is accelerated by F, whereby it tends to be easy to realize a glass structure having a low fictive temperature (first effect). Thus, F-doping to $TiO_2$—$SiO_2$ glass in a large amount is effective to lower the fictive temperature and to broaden the temperature range for zero expansion.

However, the effect to broaden the temperature range for zero expansion by F-doping is considered to be greater than the effect only by the lowered fictive temperature (second effect).

In a case where the $TiO_2$—$SiO_2$ glass of the present invention is doped with F for the purpose of broadening the temperature range for zero expansion, the content of F is preferably at least 100 mass ppm. It is preferably at least 200 mass ppm, more preferably at least 500 mass ppm, particularly preferably at least 2,000 mass ppm, most preferably at least 5,000 mass ppm.

Further, doping of a halogen except for F is also considered to be effective like F to reduce the change by temperature of the coefficient of thermal expansion within the temperature range of from −50 to 150° C. and to broaden the temperature range showing zero expansion, with respect to $TiO_2$—$SiO_2$ glass.

The following several processes are available as processes for producing $TiO_2$—$SiO_2$ glass containing F. One of them is a soot process which comprises depositing and growing $TiO_2$—$SiO_2$ glass particles (soot) obtained by flame hydrolysis or thermal decomposition of a Si precursor and a Ti precursor as glass-forming materials, to obtain a porous $TiO_2$—$SiO_2$ glass body, treating the obtained porous $TiO_2$—$SiO_2$ glass body in a F-containing atmosphere, followed by heating to a temperature of at least a vitrification temperature to obtain a F-containing $TiO_2$—$SiO_2$ glass body. As such a soot process, a MCVD process, an OVD process and a VAD process are, for example, available depending upon the manner of preparation of the soot.

As a soot process, there is a process for producing a F-containing $TiO_2$—$SiO_2$ glass body, by using compounds containing F as the Si precursor and the Ti precursor as the glass-forming materials, or by feeding the Si precursor and the Ti precursor to flame hydrolysis or thermal decomposition in a F-containing atmosphere to obtain a F-containing porous $TiO_2$—$SiO_2$ glass body.

Further, there is a process for producing a F-containing $TiO_2$—$SiO_2$ glass body, wherein by a direct method, compounds containing F are used as the Si precursor and the Ti precursor as the glass-forming materials, or the Si precursor and the Ti precursor are hydrolyzed and oxidized in an oxyhydrogen flame of from 1,800 to 2,000° C. in a F-containing atmosphere.

The method for measuring the F concentration is as follows. The glass is heated and fused by anhydrous sodium carbonate, and to the obtained fused liquid, distilled water and hydrochloric acid are added each in a volume ratio of 1 to the fused liquid, to obtain a sample liquid. The electromotive force of the sample liquid is measured by a radiometer by using a F ion selective electrode and, as a comparative electrode, No. 945-220 and No. 945-468 manufactured by Radiometer Trading Company, respectively, and the F content is obtained based on a calibration curve preliminarily prepared by using a F ion standard solution (Journal of Japanese Chemical Society, 1972 (2), 350). Here, the detection limit by this method is 10 ppm.

The following process can be employed for producing the glass of the present invention.

(a) Porous Glass Body Formation Step $TiO_2$—$SiO_2$ glass particles obtained by flame hydrolysis of a Si precursor and a Ti precursor as glass-forming materials, are deposited and grown on a target to form a porous $TiO_2$—$SiO_2$ glass body. The glass-forming materials are not particularly limited so long as they are materials capable of being gasified. However, the Si precursor may, for example, be a silicon halide compound, such as a chloride such as $SiCl_4$, $SiHCl_3$, $SiH_2Cl_2$ or $SiH_3Cl$, a fluoride such as $SiF_4$, $SiHF_3$ or $SiH_2F_2$, a bromide such as $SiBr_4$ or $SiHBr_3$ or an iodide such as $SiI_4$, or an alkoxy silane represented by $R_nSi(OR)_{4-n}$ (wherein R is a $C_{1-4}$ alkyl group, and n is an integer of from 0 to 3), and the Ti precursor may, for example, be a titanium halide compound such as $TiCl_4$ or $TiBr_4$, or a titanium alkoxide represented by $R_nSi(OR)_{4-n}$ (wherein R is a $C_{1-4}$ alkyl group, and n is an integer of from 0 to 3). Further, as the Si precursor and the Ti precursor, a compound of Si and Ti, such as a silicon-titanium alkoxide, may also be used.

As the target, a quartz glass target (such as a target as disclosed in JP-B-63-24973) may be used. It may not be limited to a rod shape, and a plate-shaped target may be employed.

Further, in a case where the porous glass body is to be doped with F, the following step may be carried out after porous glass body formation step.

(b) F-Doping Step

The porous $TiO_2$—$SiO_2$ glass body obtained in porous glass body formation step is held in an atmosphere containing oxygen and F to obtain a F-containing porous $TiO_2$—$SiO_2$ glass body. As such an atmosphere containing oxygen and F, a gas atmosphere containing from 0.1 to 50 vol % of a F-containing gas (such as $SiF_4$, $SF_6$, $CHF_3$, $CF_4$, $C_2F_6$, $C_3F_8$ or $F_2$) and containing from 50 to 99.9 vol % of oxygen is preferred.

In such an atmosphere, it is preferred to carry out treatment under a pressure of about 1 atm for from a few tens minutes to a few hours at room temperature or at a high temperature of at most 1,300° C. In a case where it is desired to lower the treating temperature and yet to have the same amount of F doped, the treating time may be extended so that the glass body is held for from 5 hours to a few tens hours. If the temperature is increased too much, densification of the porous glass body will proceed, whereby it tends to be difficult to have F doped to the interior of the porous glass body, or bubbles may form after verification, such being undesirable. The treating temperature is more preferably at most 1,250° C., particularly preferably at most 1,200° C.

For example, in a case where $SiF_4$ is employed as the F-containing atmosphere, the treating temperature and the treating time may be set as follows depending upon the amount of F to be doped to the porous glass body.

In a case where it is desired to control the amount of F doped to a level of less than 1,000 mass ppm, the glass body may be held in a gas atmosphere containing from 1 to 10 vol % of $SiF_4$ and from 99 to 90% of oxygen at room temperature for from two hours to a few tens hours. In a case where it is desired to adjust the amount of F doped to a level of from 1,000 to 5,000 mass ppm, it may be held in a gas atmosphere containing from 2 to 10 vol % of $SiF_4$ and from 98 to 90 vol % of oxygen at from 500 to 1,000° C. for from two hours to a few tens hours. In a case where it is desired to adjust the amount of F doped to a level of from 5,000 mass ppm to 10,000 mass ppm, it may be held in a gas atmosphere containing from 5 to a few tens vol % of $SiF_4$ and from 95 to a few tens vol % of oxygen at from 1,000 to 1,300° C. for from two hours to a few tens hours.

Further, in F-doping step, in order to dope the porous glass body with F uniformly in a short time, it is preferred that the porous glass body is held under a reduced pressure and then a F-containing gas and oxygen in a predetermined proportion are introduced until the pressure becomes atmospheric pressure to achieve an atmosphere containing oxygen and F.

(c) Oxygen Treatment Step

The porous $TiO_2$—$SiO_2$ glass body obtained in the porous glass formation step is difficult to handle as it is, and accordingly it is preferably held in an atmosphere containing at least 15 vol % of oxygen to obtain a porous $TiO_2$—$SiO_2$ glass body having an oxygen treatment applied thereto. Further, the F-containing porous $TiO_2$—$SiO_2$ glass body obtained in F-doping step is held in an atmosphere containing at least 15 vol % of oxygen to obtain a porous $TiO_2$—$SiO_2$ glass body having an oxygen treatment applied thereto. When an oxygen treatment is applied to the F-containing porous $TiO_2$—$SiO_2$ glass body, in order to improve the transmittance of the silica glass containing $TiO_2$ to be obtained, the oxygen concentration is preferably high, and it is preferably at least 50%, more preferably at least 70%, particularly preferably at least 90%. It is preferred to carry out an oxygen treatment under a pressure of about 1 atm for from a few tens minutes to a few hours at a high temperature in such an atmosphere.

If the treating temperature is increased too much, excessive densification of the porous glass body will proceed, and bubbles may form after vitrification, and accordingly it is not preferred to increase the treating temperature too much. Further, if the treating temperature is low, the effect of improving the transmittance tends to be low. Accordingly, the treatment is carried out preferably at a temperature of at least 500° C. and at most 1,300° C., more preferably at least 800° C. and at most 1,250° C., particularly preferably at least 900° C. and at most 1,200° C.

Particularly when F-doping step is carried out, oxygen treatment step is carried out because the glass will be colored if the porous glass body is vitrified in densification step without carrying out oxygen treatment step.

(d) Densification Step

The porous $TiO_2$—$SiO_2$ glass body obtained in porous glass formation step or the porous $TiO_2$—$SiO_2$ glass body having an oxygen treatment applied thereto obtained in oxygen treatment step is heated to a densification temperature to obtain a $TiO_2$—$SiO_2$ dense body containing substantially no bubbles or air bubbles. In the present specification, the densification temperature is a temperature at which a porous glass body can be densified until no more void can be detected by an optical microscope. The densification temperature is preferably from 1,100 to 1,750° C., more preferably from 1,200 to 1,550° C.

The atmosphere is, in the case of an atmospheric pressure, preferably an atmosphere of 100% inert gas such as helium or an atmosphere containing an inert gas such as helium, as the main component. In the case of a reduced pressure, the atmosphere is not particularly limited.

(e) Vitrification Step

The $TiO_2$—$SiO_2$ dense body obtained in densification step is heated to a vitrification temperature to obtain a high transmittance glass body containing substantially no crystalline component. The vitrification temperature is preferably from 1,400 to 1,750° C., more preferably from 1,500 to 1,700° C.

The atmosphere is not particularly limited, but is, in the case of an atmospheric pressure, preferably the same atmosphere as in densification step, i.e. an atmosphere of 100% inert gas such as helium or an atmosphere containing an inert gas such as helium as the main component. Further, in the case of a reduced pressure, densification step and vitrification step can be carried out at the same time.

Further, the following process can be employed for producing the glass of the present invention.

(f) Forming Step

The high transmittance glass body obtained in vitrification step is heated to a forming temperature to obtain a formed glass body formed into a desired shape. The forming temperature is preferably from 1,500 to 1,750° C. If it is lower than 1,500° C., no substantial deadweight transformation take place, since the viscosity of the glass is high, and growth of cristobalite being a crystalline phase of $SiO_2$ or growth of rutile or anatase being a crystalline phase of $TiO_2$ takes place, thus leading to so-called devitrification. If the temperature is at least 1,750° C., sublimation of $SiO_2$ or reduction of $TiO_2$ may occur. The temperature is more preferably at most 1,740° C. so as to prevent coloring due to sublimation of $SiO_2$ or reduction of $TiO_2$.

Further, the $TiO_2$—$SiO_2$ dense body obtained in densification step may be subjected to forming step without carrying out vitrification step, whereby vitrification step can be omitted. That is, vitrification and forming can be carried out at the same time in forming step. The atmosphere is not particularly limited.

In order to anneal the glass of the present invention and to control the fictive temperature, the following process can be employed.

(g) Annealing Step

The fictive temperature of the glass is controlled by carrying out an annealing treatment comprising holding the high transmittance glass body obtained in vitrification step or the formed glass body obtained in forming step at a temperature of from 600 to 1,200° C. for at least 5 hours and then cooling it to a temperature of at most 500° C. at an average cooling rate of at most 150° C./hr. Otherwise, the fictive temperature of the glass is controlled by carrying out an annealing treatment comprising, in the temperature-lowering process from a temperature of at least 1,200° C. in vitrification step or in forming step, cooling the high transmittance glass body or formed glass body to be obtained from 1,200° C. to 500° C. at an average cooling rate of at most 150° C./hr. In such cases, the average cooling rate is more preferably at most 100° C./hr, furthermore preferably at most 50° C./hr. It is particularly preferably at most 10° C./hr. After the glass body is cooled to a temperature of at most 500° C., it may be left to cool. The atmosphere is not particularly limited.

EXAMPLES

Now, the present invention will be explained in further detail with reference to Examples. However, it should be understood that the present invention is by no means restricted thereto.

Example 1

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of about 80 mm and a length of about 100 mm (porous glass body formation step).

The obtained porous $TiO_2$—$SiO_2$ glass body was difficult to handle as it was, and as deposited on the target, it was maintained at 1,200° C. for 4 hours in atmospheric air and then removed from the target.

Thereafter, it was held in an atmosphere of 100% He at 1,450° C. for 4 hours to obtain a $TiO_2$—$SiO_2$ dense body (densification step).

The obtained $TiO_2$—$SiO_2$ dense body was held at 1,650° C. for 4 hours to obtain a high transmittance glass body (vitrification step).

The obtained high transmittance glass body was put in a carbon mold, heated at 1,650° C. and formed into a block shape, to obtain a formed glass body (forming step).

The obtained formed glass body was held at 1,200° C. for 20 hours, and then cooled to 500° C. at 5° C./hr and then left to cool to room temperature (annealing step).

Example 2

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of about 250 mm and a length of about 1,000 mm (porous glass body formation step).

The obtained porous $TiO_2$—$SiO_2$ glass body was difficult to handle as it was, and as deposited on the target, it was maintained at 1,200° C. for 4 hours in atmospheric air and then removed from the target.

Thereafter, the porous $TiO_2$—$SiO_2$ glass body was held at 1,450° C. for 4 hours under reduced pressure to obtain a $TiO_2$—$SiO_2$ dense body (densification step).

The obtained $TiO_2$—$SiO_2$ dense body was put in a carbon mold and held at 1,700° C. for 10 hours to obtain a formed glass body having a high transmittance (forming step). In this forming step, vitrification is simultaneously carried out.

The obtained formed glass body was cooled from 1,200° C. to 500° C. at 100° C./hr and then left to cool to room temperature (annealing step).

Example 3

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of about 80 mm and a length of about 100 mm (porous glass body formation step).

The obtained porous $TiO_2$—$SiO_2$ glass body was difficult to handle as it was, and as deposited on the target, it was maintained at 1,200° C. for 4 hours in atmospheric air and then removed from the target.

Thereafter, the porous $TiO_2$—$SiO_2$ glass body was set in a chamber capable of controlling the atmosphere, and after reducing the pressure to 10 Torr (1,333 Pa) at room temperature, a gas mixture of $O_2/SiF_4$=90/10 (volume ratio) was introduced, and the glass body was held at room temperature under atmospheric pressure for 24 hours to carry out F-doping (F-doping step).

Further, the F-containing porous $TiO_2$—$SiO_2$ glass body was set in an electric furnace capable of controlling the atmosphere, and the glass body was heated to 1,000° C. in an atmosphere of 100% $O_2$ and held under atmospheric pressure for 30 hours (oxygen treatment step).

Then, the glass body was held in an atmosphere of 100% He at 1,450° C. for 4 hours to obtain a F-containing $TiO_2$—$SiO_2$ dense body (densification step).

The obtained F-containing $TiO_2$—$SiO_2$ dense body was held in atmospheric air at 1,650° C. for 4 hours to obtain a high transmittance glass body (vitrification step).

The obtained high transmittance glass body was put in a carbon mold, heated to 1,650° C. and formed into a block shape to obtain a formed glass body (forming step).

The obtained formed glass body was held at 900° C. for 100 hours and then cooled to 500° C. at 5° C./hr and then left to cool to room temperature (annealing step).

Example 4

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of about 80 mm and a length of about 100 mm (porous glass body formation step).

The obtained porous $TiO_2$—$SiO_2$ glass body was difficult to handle as it was, and as deposited on the target, it was maintained at 1,200° C. for 4 hours in atmospheric air and then removed from the target.

Thereafter, the porous $TiO_2$—$SiO_2$ glass body was set in a chamber capable of controlling the atmosphere, and after reducing the pressure to 10 Torr (1,333 Pa) at room temperature, while a gas mixture of $O_2/SiF_4$=90/10 (volume ratio) was introduced, the glass body was held at 1,000° C. under atmospheric pressure for 4 hours in this atmosphere to carry out F-doping (F-doping step).

Further, the glass body was heated to 1,050° C. in an atmosphere of 100% $O_2$ and held under atmospheric pressure for 30 hours (oxygen treatment step).

Then, the glass body was held in an atmosphere of 100% He at 1,450° C. for 4 hours to obtain a F-containing $TiO_2$—$SiO_2$ dense body (densification step).

The obtained F-containing $TiO_2$—$SiO_2$ dense body was held in atmospheric air at 1,650° C. for 4 hours to obtain a high transmittance glass body (vitrification step).

The obtained high transmittance glass body was put in a carbon mold, heated to 1,650° C. and formed into a block shape to obtain a formed glass body (forming step).

The obtained formed glass body was held at 1,000° C. for 20 hours and then cooled to 500° C. at 5° C./hr and then left to cool to room temperature (annealing step).

Example 5

ULE#7972 manufactured by Corning Incorporated, known to be a zero expansion $TiO_2$—$SiO_2$ glass, was held at 900° C. for 100 hours and then quenched to control the fictive temperature.

Example 6

A $TiO_2$—$SiO_2$ glass was obtained in the same manner as in Example 1 except that in annealing step, the obtained formed glass body was set in an electric furnace and held at 1,300° C. for 2 hours and then quenched to control the fictive temperature.

Example 7

A $TiO_2$—$SiO_2$ glass was obtained in the same manner as in Example 1 except that in forming step, the obtained high transmittance glass body was heated at 1,750° C. and formed into a block shape, and that in annealing step, the obtained formed glass body was set in an electric furnace, held at 1,200° C. for 20 hours, and cooled to 500° C. at 5° C./hr and then left to cool to room temperature.

Example 8

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of about 80 mm and a length of about 100 mm (porous glass body formation step).

The obtained porous $TiO_2$—$SiO_2$ glass body was difficult to handle as it was, and as deposited on the target, it was maintained at 1,200° C. for 4 hours in atmospheric air and then removed from the target.

Thereafter, the porous $TiO_2$—$SiO_2$ glass body was set in a chamber capable of controlling the atmosphere, and after reducing the pressure to 10 Torr (1,333 Pa) at room temperature, while a gas mixture of $He/SiF_4$=90/10 (volume ratio) was introduced, the glass body was held at 1,000° C. under atmospheric pressure for 4 hours in this atmosphere to carry out F-doping (F-doping step).

Further, the glass body was heated to 480° C. in an atmosphere of 100% $O_2$ and held under atmospheric pressure for 30 hours (oxygen treatment step).

Then, the glass body was held in an atmosphere of 100% He at 1,450° C. for 4 hours to obtain a F-containing $TiO_2$—$SiO_2$ dense body (densification step).

The obtained F-containing $TiO_2$—$SiO_2$ dense body was held in atmospheric air at 1,650° C. for 4 hours to obtain a high transmittance glass body (vitrification step).

The obtained high transmittance glass body was put in a carbon mold, heated to 1,650° C. and formed into a block shape to obtain a formed glass body (forming step).

The obtained formed glass body was held at 1,000° C. for 20 hours and then cooled to 500° C. at 5° C./hr and then left to cool to room temperature (annealing step).

Figure 8:
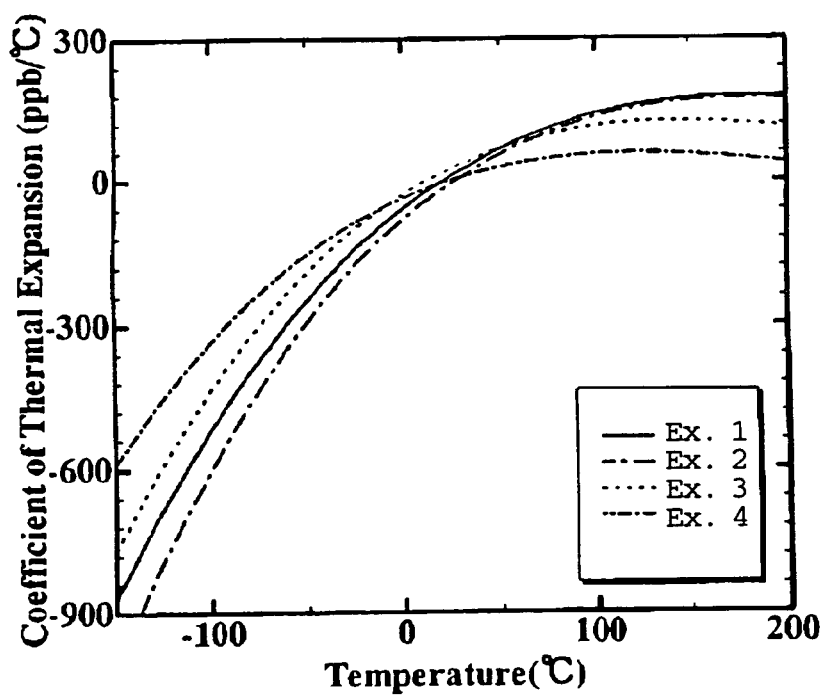
FIG. 8 is a diagram illustrating changes by temperature of the coefficients of thermal expansion of glasses of Examples 1 to 4 of the present invention.
Figure 9:
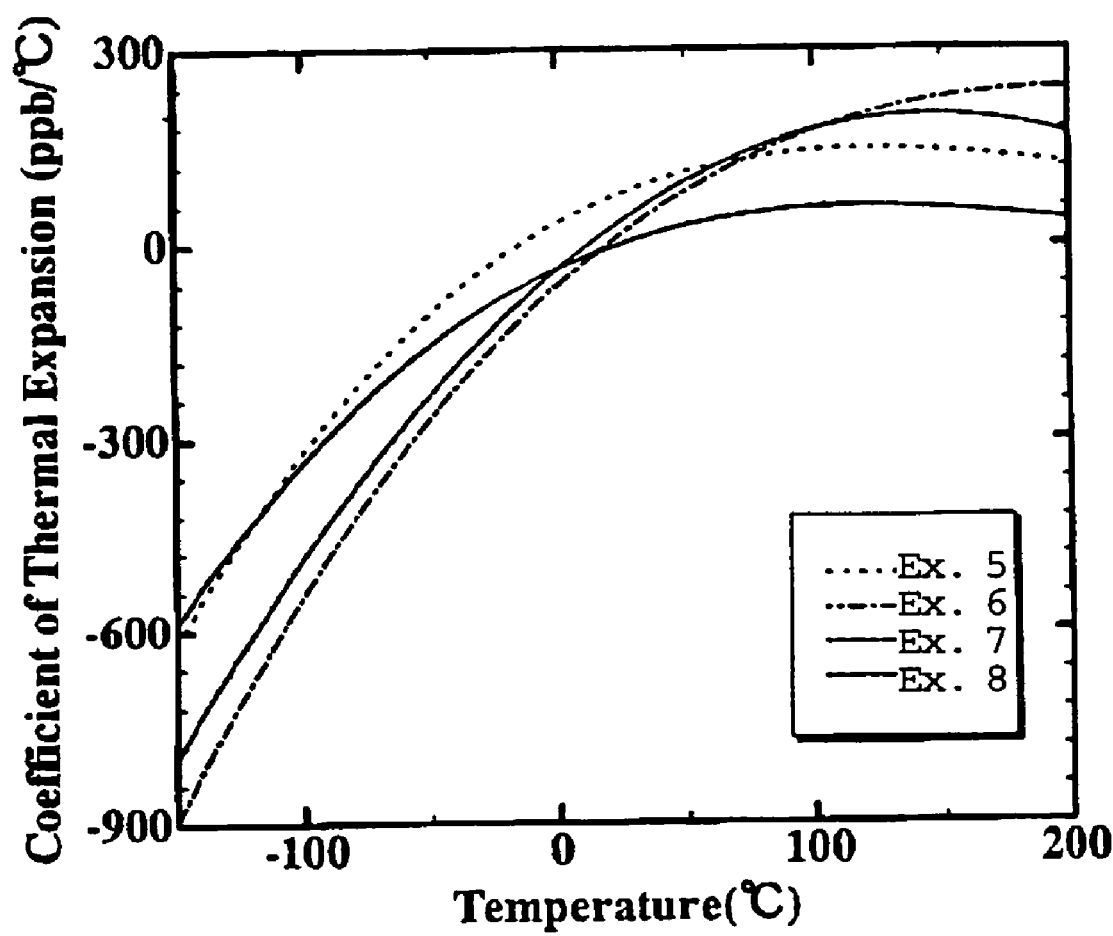
FIG. 9 is a diagram illustrating changes by temperature of the coefficients of thermal expansion of glasses of Examples 5 to 8 of the present invention.

The internal transmittances (200 to 3,200 nm) per 1 mm thickness of the glasses prepared in above Examples 1 to 8 are shown in FIGS. 2 to 7, and the changes by temperature of the coefficients of thermal expansion are shown in FIGS. 8 and 9. Further, results of measurements of physical properties of the glasses prepared in Examples 1 to 8 are shown in Tables 1 and 2. The evaluations were carried out in accordance with the above-described measurement methods. Further, the temperature range wherein the coefficient of thermal expansion is 0±5 ppb/° C. shown in Table 2 was calculated by obtaining the range of a temperature at which the coefficient of thermal expansion is from −5 to 5 ppb/° C. from each of the curves in FIGS. 8 and 9. Examples 1 to 4 are Examples of the present invention, and Examples 5 to 8 are Comparative Examples.

TABLE 1

| | Fictive temperature (° C.) | OH group concentration (mass ppm) | $Ti^{3+}$ concentration (mass ppm) | F concentration (mass ppm) | $T_{400-700}$ (%) | $T_{300-700}$ (%) | $T_{300-3000}$ (%) |
|---|---|---|---|---|---|---|---|
| Ex. 1 | 1.160 | 40 | 2 | — | >97.4 | >91.6 | >90.9 |
| Ex. 2 | 1.020 | 40 | 7 | — | >93.6 | >88.5 | >88.5 |
| Ex. 3 | 890 | 10 | 12 | 120 | >93.0 | >82.9 | >82.9 |
| Ex. 4 | 890 | 10 | 12 | 6.300 | >92.6 | >84.4 | >84.4 |
| Ex. 5 | 900 | 880 | 1 | — | >95.9 | >89.6 | >12.5 |
| Ex. 6 | 1.330 | 40 | 2 | — | >95.4 | >88.9 | >88.9 |
| Ex. 7 | 1.160 | 10 | 82 | — | >79.3 | >65.6 | >65.6 |
| Ex. 8 | 880 | 10 | 75 | 6.300 | >56.5 | >36.9 | >36.9 |

TABLE 2

| | Coefficient of thermal expansion from 0 to 100° C. CTE$_{0-100}$ (ppb/° C.) Minimum value to maximum value | Coefficient of thermal expansion from -50 to 150° C. CTE$_{-50-150}$ (ppb/° C.) Minimum value to maximum value | Temperature range (° C.) wherein the coefficient of thermal expansion is 0 ± 5 ppb/° C. |
|---|---|---|---|
| Ex. 1 | -60 to 140 | -250 to 175 | 3.8 |
| Ex. 2 | -80 to 130 | -270 to 165 | 3.8 |
| Ex. 3 | -30 to 100 | -190 to 125 | 4.5 |
| Ex. 4 | -40 to 55 | -155 to 60 | 7.6 |
| Ex. 5 | 30 to 145 | -105 to 145 | 4.0 |
| Ex. 6 | -60 to 170 | -270 to 225 | 3.5 |
| Ex. 7 | -40 to 175 | -230 to 200 | 3.7 |
| Ex. 8 | -40 to 55 | -160 to 55 | 7.4 |

Of the TiO$_2$—SiO$_2$ glass of Example 1, T$_{400-700}$, T$_{300-700}$ and T$_{300-3000}$ were all at least 90%, and the coefficient of thermal expansion was within a range of 0±150 ppb/° C. within a temperature range of from 0 to 100° C.

Of the TiO$_2$—SiO$_2$ glass of Example 2, T$_{400-700}$ was at least 90%, and T$_{300-700}$ and T$_{300-3000}$ were at least 80%, and the coefficient of thermal expansion was within a range of 0±150 ppb/° C. within a temperature range of from 0 to 100° C.

Of the TiO$_2$—SiO$_2$ glass containing F of Example 3, T$_{400-700}$ was at least 90%, and T$_{300-700}$ and T$_{300-3000}$ were at least 80%. Further, since F was contained, the coefficient of thermal expansion was within a range of 0±100 ppb/° C. within a temperature range of from 0 to 100° C., and within a range of 0±200 ppb/° C. within a temperature range of from -50 to 150° C.

Of the TiO$_2$—SiO$_2$ glass containing F in Example 4, T$_{400-700}$ was at least 90%, and T$_{300-700}$ and T$_{300-3000}$ were at least 80%. Further, since F was contained, the coefficient of thermal expansion was within a range of 0±100 ppb/° C. within a temperature range of from 0 to 100° C., and within a range of 0±200 ppb/° C. within a temperature range of from -50 to 150° C. Further, since F in a larger amount than Example 2 was contained, the glass of Example 4 had very excellent characteristics such that the temperature range wherein the coefficient of thermal expansion was from -5 to 5 ppb/° C. was 7.6° C.

The TiO$_2$—SiO$_2$ glass of Example 5 had a high OH group concentration and was poor in the transmittance T$_{300-3000}$ as compared with Examples 1 to 4.

The TiO$_2$—SiO$_2$ glass of Example 6 had a high fictive temperature, and thus the coefficient of thermal expansion within a temperature range of from 0 to 100° C. was out of the range of 0±150 ppb/° C.

The TiO$_2$—SiO$_2$ glass of Example 7 had a high Ti$^{3+}$ concentration and was poor in the transmittance as compared with Examples 1 to 4.

The TiO$_2$—SiO$_2$ glass containing F of Example 8 had a high Ti$^{3+}$ concentration and was poor in the transmittance as compared with Examples 1 to 4.

Example 9

TiO$_2$—SiO$_2$ glass particles obtained by gasifying TiCl$_4$ and SiCl$_4$ as glass-forming materials for TiO$_2$—SiO$_2$ glass, respectively, then mixing them and feeding them to heat hydrolysis (flame hydrolysis) in oxyhydrogen flame, were deposited and grown on a target in the same manner as in Example 1 to form a porous TiO$_2$—SiO$_2$ glass body having a diameter of about 80 mm and a length of about 100 mm (porous glass body formation step), which was maintained at 1,200° C. for 4 hours in atmospheric air as deposited on the target and then removed from the target. The composition of the porous TiO$_2$—SiO$_2$ glass body as calculated as glass after vitrification was such that the TiO$_2$ concentration was 7.0 mass % and the SiO$_2$ concentration was 93.0 mass %.

Thereafter, a block shape TiO$_2$—SiO$_2$ glass was obtained by carrying out densification step, vitrification step, forming step and annealing step in the same manner as in Example 1 except that in forming step, the obtained high transmittance glass body was heated at 1,740° C.

Of the obtained TiO$_2$—SiO$_2$ glass, the Ti$^{3+}$ concentration was 40 ppm, and the internal transmittances were all at least 80% such that T$_{400-700}$>93.0%, T$_{300-700}$>85.0% and T$_{300-3000}$>85.0%, and CTE$_{0-100}$ was -60 to 140 ppb/° C. and was within a range of 0±150 ppb/° C.

Example 10

A TiO$_2$—SiO$_2$ glass was obtained in the same manner as in Example 9 except that the composition of the porous TiO$_2$—SiO$_2$ glass body as calculated as glass after vitrification was such that the TiO$_2$ concentration was 2.0 mass % and the SiO$_2$ concentration was 98.0 mass %. CTE$_{0-100}$ of the obtained TiO$_2$—SiO$_2$ glass was +240 to +460 ppb/° C.

Example 11

In the same manner as in Example 9, a porous TiO$_2$—SiO$_2$ glass body having a composition as calculated as glass after vitrification such that the TiO$_2$ concentration was 7.0 mass % and the SiO$_2$ concentration was 93.0 mass %, was formed (porous glass body formation step) and maintained at 1,200° C. for 4 hours in atmospheric air and then removed from the target.

Thereafter, a block shape TiO$_2$—SiO$_2$ glass was obtained by carrying out densification step, vitrification step, forming step and annealing step in the same manner as in Example 2 except that in the cooling process in forming step, the formed glass body was cooled from 1,200° C. to 500° C. at 130° C./hr and then left to cool to room temperature (annealing step).

Of the obtained TiO$_2$—SiO$_2$ glass, the fictive temperature was 1,190° C., the Ti$^{3+}$ concentration was 7 ppm, the internal transmittances were all at least 80% such that T$_{400-700}$>93.5%, T$_{300-700}$>88.3% and T$_{300-3000}$>88.3%, and CTE$_{0-100}$ was -65 to 140 ppb/° C. and was within a range of 0±150 ppb/° C.

Example 12

In the same manner as in Example 9, a porous TiO$_2$—SiO$_2$ glass body having a composition as calculated as glass after vitrification step such that the TiO$_2$ concentration was 7.0 mass % and the SiO$_2$ concentration was 93.0 mass % was formed (porous glass body formation step), and maintained at 1,200° C. for 4 hours in atmospheric air and then removed from the target.

Then, a block shape TiO$_2$—SiO$_2$ glass containing F was obtained by carrying out F-doping step, oxygen treatment step, densification step, vitrification step and forming step, and annealing step in the same manner as in Example 4 except that in annealing step, the formed glass body was held at 1,000° C. for 20 hours and then cooled to 500° C. at 130° C./hr.

Of the obtained TiO$_2$—SiO$_2$ glass containing F, the fictive temperature was 920° C., the F concentration was 6,300 ppm, the Ti$^{3+}$ concentration was 12 ppm, the internal transmittances were all at least 80% such that $T_{400-700}>92.3\%$, $T_{300-700}>84.2\%$ and $T_{300-3000}>84.2\%$, and $CTE_{0-100}$ was −45 to 55 ppb/° C. and was within a range of 0±150 ppb/° C.

INDUSTRIAL APPLICABILITY

The vitrified extremely low thermal expansion glass of the present invention, having a wide temperature range wherein the coefficient of thermal expansion is substantially zero and being is excellent in transparency, is very useful as a material for a component constituting an optical system to be used for EUVL.

The entire disclosure of Japanese Patent Application No. 2004-195682 filed on Jul. 1, 2004 including specification, claims, drawings and summary is incorporated herein by reference in its entirety.

What is claimed is:

1. A silica glass containing $TiO_2$, which has a $TiO_2$ concentration of from 3 to 10 mass %, a OH group concentration of at most 600 mass ppm and a $Ti^{3+}$ concentration of at most 70 mass ppm, characterized by having a fictive temperature of at most 1,000° C., a coefficient of thermal expansion $CTE_{0-100}$ from 0 to 100° C. of 0±150 ppb/° C., and an internal transmittance $T_{400-700}$ per 1 mm thickness in a wavelength range of from 400 to 700 nm of at least 80%.

2. The silica glass containing $TiO_2$ according to claim 1, which has a F concentration of at least 100 mass ppm.

3. The silica glass containing $TiO_2$ according to claim 1, which has an internal transmittance $T_{300-3000}$ per 1 mm thickness in a wavelength range of from 300 to 3,000 nm of at least 70%.

4. The silica glass containing $TiO_2$ according to claim 1, which has a temperature range of at least 4.0° C. wherein the coefficient of thermal expansion becomes is 0±5 ppb/° C.

5. The silica glass containing $TiO_2$ according to claim 1, wherein the fictive temperature is at most 900° C.

6. The silica glass containing $TiO_2$ according to claim 1, wherein the $TiO_2$ concentration is from 5 to 9 mass %.

7. The silica glass containing $TiO_2$ according to claim 1, wherein $T_{400-700}$ per 1 mm thickness in a wavelength range of from 400-700 nm is at least 90%.

8. The silica glass containing $TiO_2$ according to claim 1, wherein $CTE_{0-100}$ from 0 to 100° C. is 0±100 ppb/0° C.

9. The silica glass containing $TiO_2$ according to claim 1, wherein the OH group concentration is at most 100 mass ppm.

10. The silica glass containing $TiO_2$ according to claim 1, wherein the $Ti^{3+}$ concentration is at most 20 mass ppm.

11. The silica glass containing $TiO_2$ according to claim 1, which has an internal transmittance $T_{300-700}$ per 1 mm thickness in wavelength range of from 300 to 700 nm of at least 80%.

12. The silica glass containing $TiO_2$ according to claim 3, wherein $T_{300-3000}$ per 1 mm thickness in wavelength range of from 300 to 3000 nm is at least 80%.

13. The silica glass containing $TiO_2$ according to claim 2, wherein the F concentration is at least 5000 mass ppm.

* * * * *